Patented June 17, 1930

1,764,036

UNITED STATES PATENT OFFICE

SAMUEL LEWIS SUMMERS, OF FORT WASHINGTON, PENNSYLVANIA

METHYLENE-DISALICYLIC-ACID DERIVATIVE

No Drawing.    Application filed July 5, 1928.  Serial No. 290,710.

My invention relates to organic compounds and their manufacture, and is especially concerned with a novel condensation product of methylene-diethyl-salicylate (and its homologues hereinafter indicated) with benzaldehyde and pyruvic acid. My new products are useful for pharmaceutical purposes, as hereinafter set forth.

My product may be prepared as follows: Starting with methylene-disalicylic acid, the first step is esterification. Various homologous esters may be produced in the manner hereinafter described,—by using the corresponding methyl, ethyl, propyl or other alcohols,—with a corresponding difference in the esterification product. A way of carrying out the esterification with ethyl alcohol is as follows:

Dissolve 288 lbs. of methylene-disalicylic acid in 150 lbs. of ethyl alcohol, and slowly add to the solution, at a temperature of 70° C., a solution of 60 lbs. 66° Bé. sulphuric acid diluted with 40 lbs. water. When this has all been added, raise the temperature to 150° C. under a reflux condenser, and hold at this temperature for about 2 hours. The essential product is the ester, methylene-diethyl-salicylate:

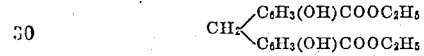

This may be washed free of any sulphuric acid left over from the reaction.

The next main step is to convert this ester to an amide, which may be done as follows:

Dissolve the ester in 120 lbs. of strong aqueous ammonia ("concentrated", or 28% $NH_3$), and heat the solution under pressure (in an autoclave), maintaining it at a temperature of 110° C. for eight hours. The essential product is methylene-disalicyl-amide, having the formula:

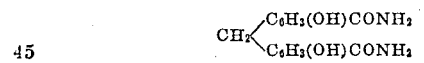

The next main step is a condensation treatment of this amide with benzaldehyde, which may be performed as follows:

Mix and heat 348 pounds of this amide (prepared as above described, or in any other suitable way) under a reflux condenser with 212 pounds of benzaldehyde and a condensing agent (say 212 pounds of zinc chloride), and also 522 pounds of ethyl alcohol,—these proportions being by weight,—maintaining a temperature of about 80° C. for 48 hours. The essential product appears to be a methylene-dibenzal-disalicyl compound, corresponding to the empirical formula $$C_{29}H_{22}O_4N_2.$$

I believe the reaction and the structural formula of the product to be as follows:

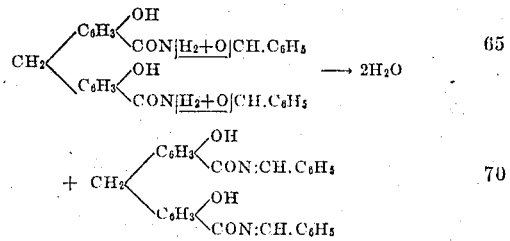

The next main step is a condensation treatment of this product (the methylene-dibenzal-disalicyl compound) with pyruvic acid, which may be performed as follows:

Mix the said product, obtained as above described, with 200 lbs. of pyruvic acid, and heat to 130° C., maintaining this temperature for 24 hours. The essential product (difficult to name) appears to correspond to the empirical formula $C_{35}H_{26}O_8N_2$, and I believe its structural formula to be:

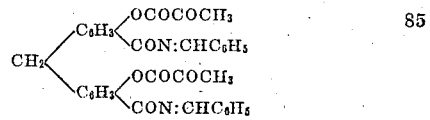

It is a crystalline substance, insoluble in cold water, but soluble in alcohol. It has valuable pharmaceutical properties and uses, particularly as an antiseptic, antineuralgic, antiarthritic, and antirheumatic. Dosage (internally), 90 to 180 grains per day.

Having thus described my invention, I claim:

The hereindescribed condensation product of methylene-disalicyl-amide successively with benzaldehyde and pyruvic acid; insoluble in cold water, but soluble in alcohol.

In testimony whereof, I have hereunto signed my name at Philadelphia, Pennsylvania, this 29th day of June, 1928.

SAMUEL LEWIS SUMMERS.